No. 779,873. PATENTED JAN. 10, 1905.
W. H. SARGENT.
CREAM TEST SCALE.
APPLICATION FILED APR. 18, 1904.
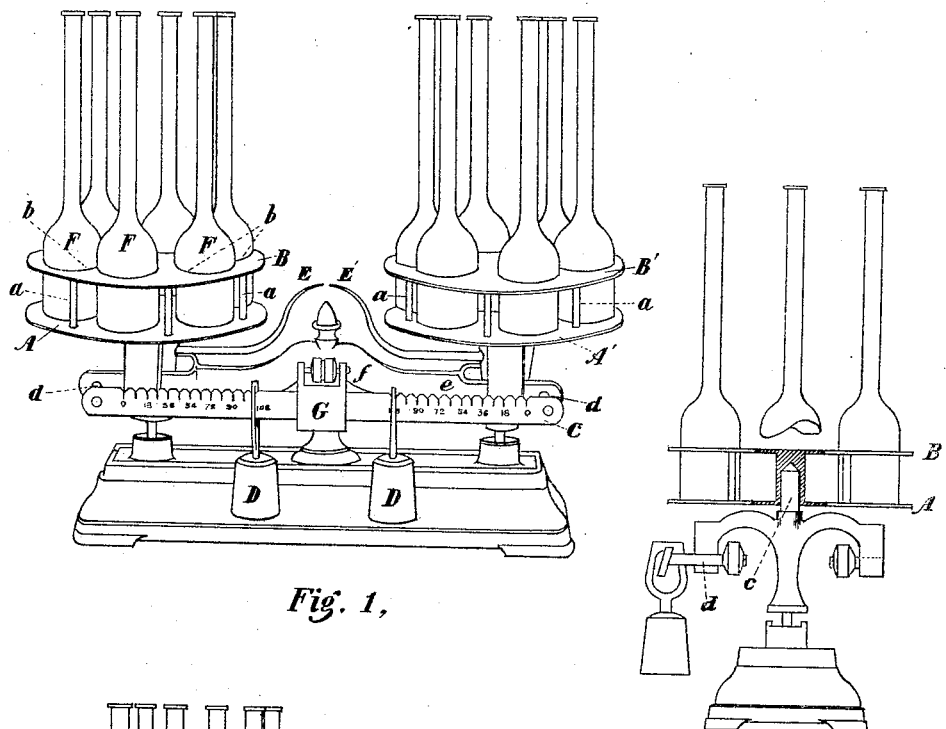
Fig. 1.
Fig. 2.
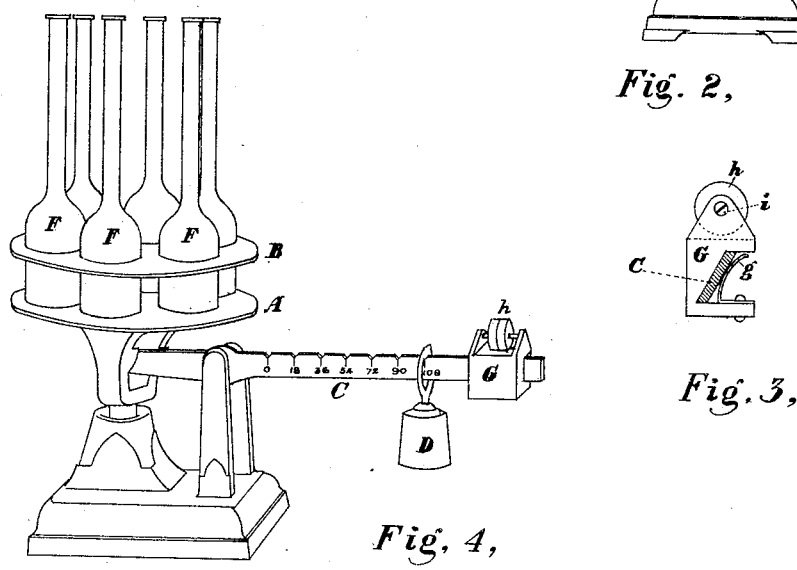
Fig. 4.
Fig. 3.
Witnesses
Albert Popkins
Grace P. Brereton.
Inventor
Willis H. Sargent
By Sturtevant & Fraley
Attorneys No. 779,873. Patented January 10, 1905.

UNITED STATES PATENT OFFICE.

WILLIS H. SARGENT, OF ST. JOHNSBURY, VERMONT, ASSIGNOR TO E. & T. FAIRBANKS & COMPANY, OF ST. JOHNSBURY, VERMONT, A CORPORATION OF VERMONT.

CREAM-TEST SCALE.

SPECIFICATION forming part of Letters Patent No. 779,873, dated January 10, 1905.

Application filed April 18, 1904. Serial No. 203,639.

*To all whom it may concern:*

Be it known that I, WILLIS H. SARGENT, a citizen of the United States, residing at St. Johnsbury, in the county of Caledonia, State of Vermont, have invented certain new and useful Improvements in Cream-Test Scales, of which the following is a description, reference being had to the accompanying drawings and to the letters of reference marked thereon.

My invention relates to an improvement in weighing-scales, especially to a scale for use in connection with the well-known Babcock test for determining the amount of butter-fat in different kinds of milk.

The object of the invention is to provide a scale adapted to receive and weigh a plurality of bottles of milk and to insure an equal exact amount of milk in each bottle.

The invention therefore consists in the various matters hereinafter described, and referred to in the appended claims.

The invention is illustrated in the accompanying drawings, in which—

Figure 1 is a side elevation of a weighing-scale embodying the invention. Fig. 2 is an end view, partly in section, showing the pivotal supporting arrangement for the bottle-holder. Fig. 3 is a detail view in section of the balance-poise; and Fig. 4 is a view similar to Fig. 1, but showing a scale adapted to support a single series of bottles.

In the drawings the scale in general is of the well-known Fairbanks type of even-balance scale, A A' being the scale-plates thereof.

B B' are additional plates attached to the plates A A' by posts $a$, having openings $b$ (six in number) in each plate of a suitable size to receive the test-bottles F, which pass through the openings and rest with their bottoms on the bottom plates A A'. The bottle-supports are swiveled or sleeved on the posts $c$, so that they may revolve to bring the bottles within convenient reach of the operator.

The beam C is secured by the horizontal rods $d$ to the arms of the yokes $e$ on opposite ends of the pivotal scale-beam $f$. The beam C is graduated upwardly from the opposite ends toward the center, each end carrying the hanging poise D.

G is a central poise or balance-poise on the beam, held against it by a spring $g$ and carrying a balance-ball $h$ on the screw $i$, by which final adjustment is secured, the approximate balance being secured by the balance-ball $h$.

The pointers E E' are of usual construction and indicate when the balance has been reached.

The manner of utilization of the scale in weighing is as follows: An equal number of bottles is placed on each of the plates or bottle-holders, and if the pointers E E' do not indicate a balance the poise G is moved along until an approximate balance is effected, the final accurate adjustment by the balance-ball $h$ turning on the screw-rod $i$, the thread of which screw-rod is of very fine pitch. After the scale has been balanced one of the poises D is moved along the beam C a notch, which represents usually grams, (nine or eighteen,) and enough milk is fed into one of the bottles on one side to balance it. The poise is again set and another bottle filled, and so on until all the bottles are loaded.

So far as the construction of the bottle-holder and poise are concerned they are applicable to a scale having a holder for one set of bottles, as shown in Fig. 4.

Various minor modifications and changes may be made without departing from the spirit of my invention.

Having thus described my invention, what I claim, and desire to secure by Letters Patent, is—

1. In a scale of the character described, the combination with the scale-beam, having a poise upon each side of the central portion, and a balancing-poise, of a rotatable support at each end of the beam for the receptacles to be filled and weighed; substantially as described.

2. An even-balance scale comprising the centrally-pivoted scale-beam, having a sliding poise upon each side of its pivotal point, an intermediate balancing-poise, and rotatable scale-plates on the ends of the beam and each having a superposed spaced plate provided with circularly-arranged apertures to hold the receptacles while testing on the scale-plates.

3. In a scale, the combination with the scale-beam, of a poise open at one side to receive the scale-beam, vertically edgewise and there provided with a spring-finger pressing against the scale-beam and holding the poise in place.

4. In a scale, a poise having an opening or recess in one side of a width to receive the scale-beam and there provided with a spring-finger crossing said opening, ears projecting up from the poise, a screw-rod mounted in said ears and a poise adjustable on said rod.

5. A testing-scale comprising a centrally-pivoted scale-beam, a longitudinal scale secured to the beam paralled therewith, and provided with a middle poise and poises at opposite sides of said middle poise, scale-plates rotatably mounted on the ends of said scale-beam and circularly-arranged test-tube holders on the upper sides of the scale-plates.

In testimony whereof I affix my signature in presence of two witnesses.

WILLIS H. SARGENT.

Witnesses:
   IDA L. BECK,
   F. OLIVER FRENCH.